US011446597B2

(12) United States Patent
Habib et al.

(10) Patent No.: US 11,446,597 B2
(45) Date of Patent: Sep. 20, 2022

(54) FEATHERED BAFFLE FILTER

(71) Applicants: BSH Home Appliances Corporation, Irvine, CA (US); BSH Hausgeräte GmbH, Munich (DE)

(72) Inventors: Mikhail Habib, Nashville, TN (US); Sean Scott, LaFollette, TN (US); Derek Turner, Caryville, TN (US)

(73) Assignees: BSH Home Appliances Corporation, Irvine, CA (US); BSH Hausgeräte GmbH, Munich (DE)

( * ) Notice: Subject to any disclaimer, the term of this patent is extended or adjusted under 35 U.S.C. 154(b) by 13 days.

(21) Appl. No.: 16/950,958

(22) Filed: Nov. 18, 2020

(65) Prior Publication Data
US 2022/0152538 A1 May 19, 2022

(51) Int. Cl.
*B01D 19/00* (2006.01)
*B01D 45/08* (2006.01)
*F24C 15/20* (2006.01)

(52) U.S. Cl.
CPC .......... *B01D 45/08* (2013.01); *F24C 15/2035* (2013.01)

(58) Field of Classification Search
CPC ............................ B01D 45/08; F24C 15/2035
See application file for complete search history.

(56) References Cited

U.S. PATENT DOCUMENTS

| 722,272 | A | * | 3/1903 | Baker | B01D 45/12 55/424 |
| 1,400,860 | A | * | 12/1921 | Brown | B63J 2/10 55/432 |
| 1,519,428 | A | * | 12/1924 | Wilisch | B01D 45/08 96/299 |
| 1,926,262 | A | * | 9/1933 | Campbell | B01D 45/08 55/324 |
| 2,831,550 | A | * | 4/1958 | Bub | B01D 46/00 55/444 |
| 3,366,013 | A | * | 1/1968 | Madl, Jr. | F24F 7/10 454/187 |
| 3,425,334 | A | * | 2/1969 | Brown | B01D 46/10 126/299 D |

(Continued)

FOREIGN PATENT DOCUMENTS

| CN | 206410191 U | 8/2017 |
| DE | 2720201 A1 | 11/1978 |

(Continued)

*Primary Examiner* — Dung H Bui
(74) *Attorney, Agent, or Firm* — Michael E. Tschupp; Andre Pallapies; Brandon G. Braun

(57) ABSTRACT

A filter for an exhaust hood includes: a frame extending in a first direction and a second direction; a first baffle located in the frame, the first baffle extending in the first direction and having two edges that extend in the first direction, a first edge of the two edges of the first baffle having a first undulating shape, a second edge of the two edges of the first baffle having a second undulating shape; and a second baffle located in the frame, the second baffle extending in the first direction and having two edges that extend in the first direction, a first edge of the two edges of the second baffle having a third undulating shape, a second edge of the two edges of the second baffle having a fourth undulating shape. The first baffle and the second baffle are separated by a gap.

18 Claims, 5 Drawing Sheets

(56) References Cited

U.S. PATENT DOCUMENTS

| | | | | |
|---|---|---|---|---|
| 3,566,585 A * | 3/1971 | Voloshen et al. | ... | F24C 15/2035 55/435 |
| 3,616,744 A * | 11/1971 | Jensen | ... | F24C 15/20 126/299 E |
| 3,667,371 A * | 6/1972 | Russell | ... | F24C 15/2035 126/299 D |
| 3,813,856 A * | 6/1974 | Jensen | ... | B01D 45/08 55/444 |
| 3,834,135 A * | 9/1974 | Jordan | ... | B01D 45/08 55/444 |
| 3,837,269 A * | 9/1974 | Sweet | ... | B01D 50/00 126/299 E |
| 3,870,494 A * | 3/1975 | Doane | ... | F24C 15/2035 55/443 |
| 3,910,782 A * | 10/1975 | Struble | ... | B01D 45/08 55/444 |
| 3,945,812 A * | 3/1976 | Doane | ... | B01D 45/08 95/272 |
| 3,952,640 A * | 4/1976 | Kuechler | ... | F24C 15/20 126/299 D |
| 3,955,949 A * | 5/1976 | Rohrer | ... | A62C 4/00 55/444 |
| 4,101,299 A * | 7/1978 | Bertucci | ... | E04B 9/023 96/228 |
| 4,189,990 A * | 2/1980 | Kittier | ... | F24C 15/20 454/251 |
| 4,231,769 A * | 11/1980 | Ahirich | ... | B01D 50/00 126/299 E |
| 4,281,635 A * | 8/1981 | Gaylord | ... | F24C 15/20 126/299 D |
| 4,350,504 A * | 9/1982 | Diachuk | ... | F24C 15/20 422/105 |
| RE32,288 E * | 11/1986 | Berger | ... | A47J 37/067 29/897.15 |
| 4,690,701 A * | 9/1987 | Hedrick | ... | B01D 45/16 55/436 |
| 4,827,903 A * | 5/1989 | Kim | ... | A47J 37/0682 126/299 D |
| 4,830,644 A * | 5/1989 | Gutermuth | ... | B01D 45/06 24/545 |
| 5,141,538 A * | 8/1992 | Derington | ... | B01D 46/02 55/DIG. 36 |
| 5,147,427 A * | 9/1992 | Abbot | ... | B01D 45/08 55/302 |
| 5,154,742 A * | 10/1992 | Gault | ... | B01D 45/08 55/315.2 |
| 5,302,174 A * | 4/1994 | Guetersloh | ... | B01D 45/08 55/444 |
| 5,342,422 A * | 8/1994 | Wimbock | ... | B01D 45/08 55/444 |
| 5,429,116 A * | 7/1995 | Brown | ... | F24C 15/20 126/299 D |
| 5,679,120 A * | 10/1997 | Yamada | ... | B01D 45/08 55/440 |
| 6,125,841 A * | 10/2000 | Boudreault | ... | B08B 9/00 126/299 D |
| 6,162,286 A * | 12/2000 | Hasama | ... | B01D 50/20 96/231 |
| 6,235,090 B1 * | 5/2001 | Bernstein | ... | B03C 3/017 96/57 |
| 6,454,825 B1 * | 9/2002 | Cheimets | ... | B01D 45/08 55/446 |
| 6,776,152 B2 | 8/2004 | Lee et al. | | |
| 6,840,975 B2 * | 1/2005 | Bohacik | ... | B01D 45/08 126/299 D |
| 7,166,140 B2 * | 1/2007 | Entezarian | ... | B01D 45/08 55/320 |
| 7,422,613 B2 * | 9/2008 | Bockle | ... | F24C 15/2035 55/318 |
| 8,097,051 B2 * | 1/2012 | Zachos | ... | B01D 50/20 55/320 |
| 8,216,331 B2 * | 7/2012 | Muller | ... | B01D 46/08 55/440 |
| 9,175,866 B2 * | 11/2015 | Fuh | ... | B01D 45/08 |
| 9,372,004 B2 * | 6/2016 | Sikkenga | ... | B01D 45/16 |
| 9,726,381 B1 * | 8/2017 | Prasser | ... | B01D 45/16 |
| 10,953,357 B2 * | 3/2021 | Jeong | ... | B01D 50/20 |
| 2002/0189798 A1 * | 12/2002 | Jacobs | ... | F24C 15/2035 165/145 |
| 2004/0007132 A1 * | 1/2004 | Holmes | ... | B01D 45/08 95/272 |
| 2004/0107834 A1 * | 6/2004 | Feisthammel | ... | B01D 53/261 95/117 |
| 2004/0139858 A1 * | 7/2004 | Entezarian | ... | B01D 46/10 95/275 |
| 2005/0000199 A1 * | 1/2005 | Carter | ... | B01D 45/08 55/442 |
| 2005/0028498 A1 * | 2/2005 | Entezarian | ... | B01D 50/002 55/320 |
| 2006/0157048 A1 * | 7/2006 | Heilman | ... | F24C 15/2035 126/299 R |
| 2007/0163216 A1 * | 7/2007 | Smasal | ... | B01D 45/08 55/446 |
| 2007/0293133 A1 * | 12/2007 | Marcotte | ... | F24C 15/2035 454/67 |
| 2008/0110339 A1 * | 5/2008 | Kwok | ... | F24C 15/2035 95/31 |
| 2008/0202083 A1 * | 8/2008 | Graham | ... | B01D 45/06 55/444 |
| 2009/0194093 A1 * | 8/2009 | Aviles | ... | B01D 45/06 126/299 E |
| 2012/0079946 A1 * | 4/2012 | Dold | ... | B01D 45/08 96/425 |
| 2012/0247075 A1 * | 10/2012 | Park | ... | B01D 45/08 55/434.2 |
| 2017/0056809 A1 * | 3/2017 | Salpietra | ... | B01D 50/20 |
| 2019/0128536 A1 * | 5/2019 | Zhang | ... | F24C 15/2035 |
| 2020/0041140 A1 * | 2/2020 | Mitchell | ... | B01D 45/08 |

FOREIGN PATENT DOCUMENTS

| | | | | |
|---|---|---|---|---|
| JP | 60034713 A | * | 2/1985 | ... B01D 45/08 |
| JP | 6000314 A | | 1/1994 | |

* cited by examiner

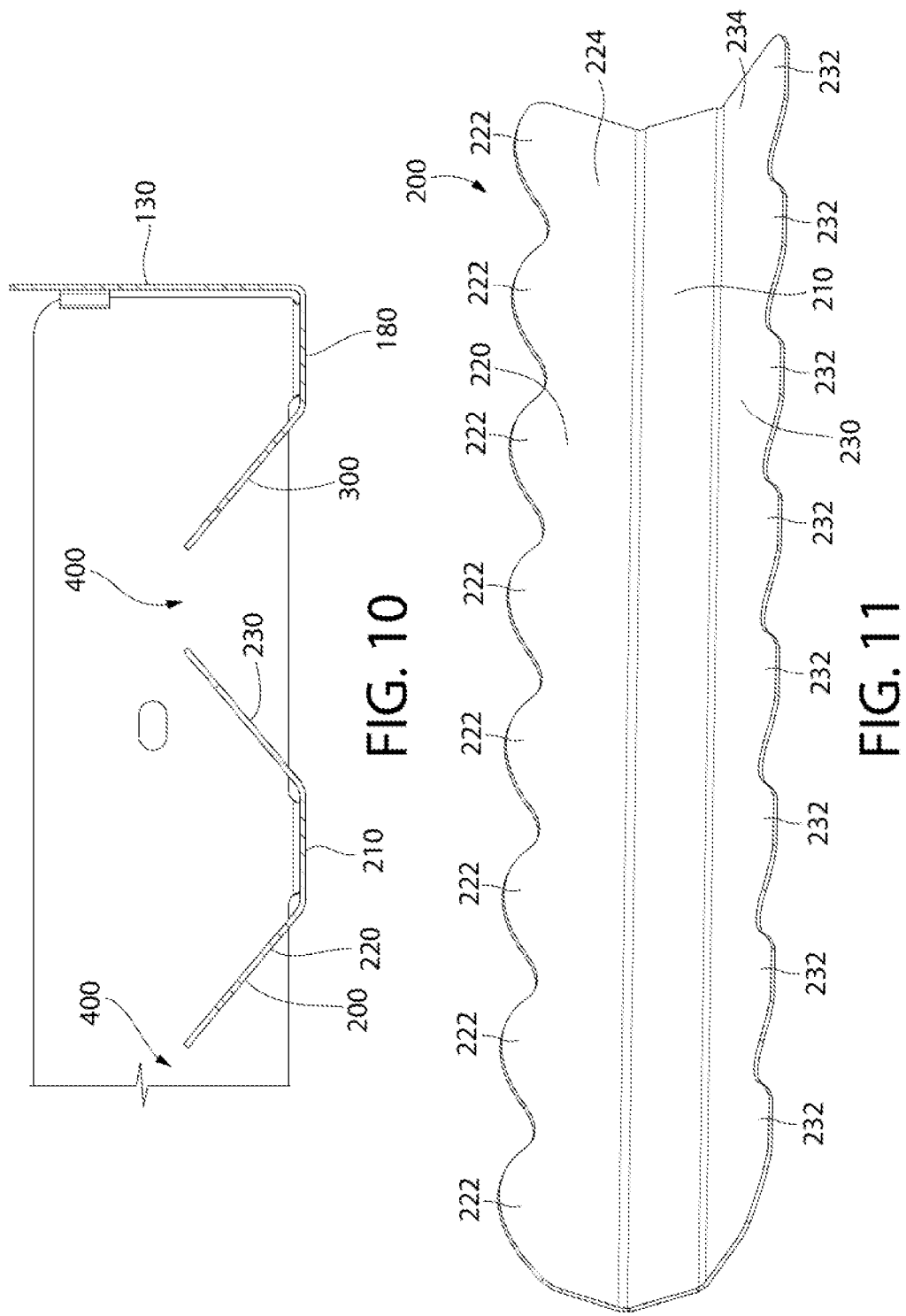

FEATHERED BAFFLE FILTER

FIELD OF THE INVENTION

The invention is directed to a filter for a kitchen appliance. More particularly, embodiments of the invention are directed to grease filter for an exhaust hood over a cooking appliance.

An example of an application for the invention is a kitchen exhaust hood having a grease filter positioned above a grill or other cooking surface.

BACKGROUND OF THE INVENTION

Some kitchens include an exhaust hood above a cooking appliance such as a cook top or a grill. In some cases, the exhaust hood has a filter that filters air and other gases rising from the cooking appliance. Some of these exhaust hoods generate a significant amount of noise when operating, at least a portion of the noise be generated by the exhaust gases passing through the filter.

Applicants recognized an improvement to the above arrangement and implement that improvement in embodiments of the invention.

SUMMARY

The invention achieves the benefit of reduced noise compared to conventional filters having baffles with straight edges. Additionally, embodiments of the invention collect more grease than conventional filters having baffles with straight edges due to increase airflow, disrupted airflow, and increased cavitation of the airflow.

Some cooking appliances have exhaust gas filters having baffles with straight edges. Embodiments of the invention improve the user experience by reducing noise created by the exhaust gases passing over and between the baffles of the filter by providing baffles with undulating, or scalloped, edges.

Particular embodiments of the invention are directed to a filter for an exhaust hood. The filter has: a frame extending in a first direction and a second direction, the second direction being perpendicular to the first direction; a first baffle located in the frame, the first baffle extending in the first direction and having two edges that extend in the first direction, a first edge of the two edges of the first baffle having a first undulating shape, a second edge of the two edges of the first baffle having a second undulating shape; and a second baffle located in the frame, the second baffle extending in the first direction and having two edges that extend in the first direction, a first edge of the two edges of the second baffle having a third undulating shape, a second edge of the two edges of the second baffle having a fourth undulating shape. The first baffle and the second baffle are separated in the second direction by a gap.

Other embodiments of the invention are directed to an exhaust hood. The exhaust hood has a housing having a filter receptacle, and a removable filter located in the filter receptacle. The filter has: a frame extending in a first direction and a second direction, the second direction being perpendicular to the first direction; a first baffle located in the frame, the first baffle extending in the first direction and having two edges that extend in the first direction, a first edge of the two edges of the first baffle having a first undulating shape, a second edge of the two edges of the first baffle having a second undulating shape; and a second baffle located in the frame, the second baffle extending in the first direction and having two edges that extend in the first direction, a first edge of the two edges of the second baffle having a third undulating shape, a second edge of the two edges of the second baffle having a fourth undulating shape. The first baffle and the second baffle are separated in the second direction by a gap.

BRIEF DESCRIPTION OF THE DRAWINGS

The following figures form part of the present specification and are included to further demonstrate certain aspects of the disclosed features and functions and should not be used to limit or define the disclosed features and functions. Consequently, a more complete understanding of the exemplary embodiments and further features and advantages thereof may be acquired by referring to the following description taken in conjunction with the accompanying drawings, wherein:

FIG. 10 is an enlarged view of area X in FIG. 9;

FIG. 11 is a perspective view of an exemplary baffle in accordance with embodiments of the invention.

DETAILED DESCRIPTION

The invention is described herein with reference to the accompanying drawings in which exemplary embodiments of the invention are shown. The invention may, however, be embodied in many different forms and should not be construed as limited to the embodiments set forth herein.

As explained above, embodiments of the invention provide an improvement to a filter for an exhaust hood or an appliance. Embodiments of the invention employ an undulating, or scalloped, edge on baffles of the filter to reduce noise generated by gasses flowing through the filter. The undulating, or scalloped, edge of the baffles mimics the trailing edge of the wings of an owl, one of the quietest birds while in flight.

Figure 1:
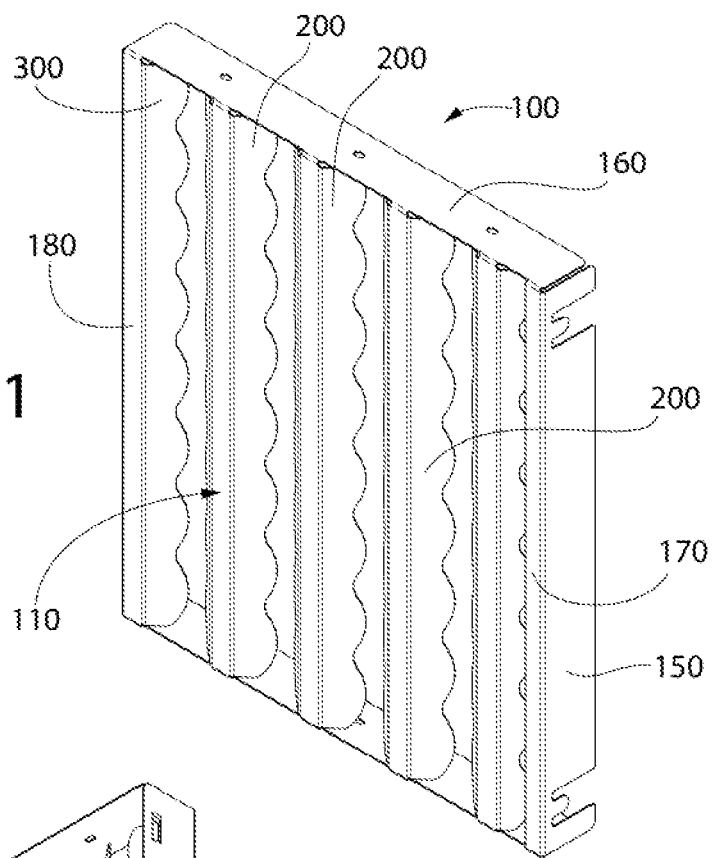
FIG. 1 is a perspective view of an exemplary filter in accordance with embodiments of the invention.
Figure 2:
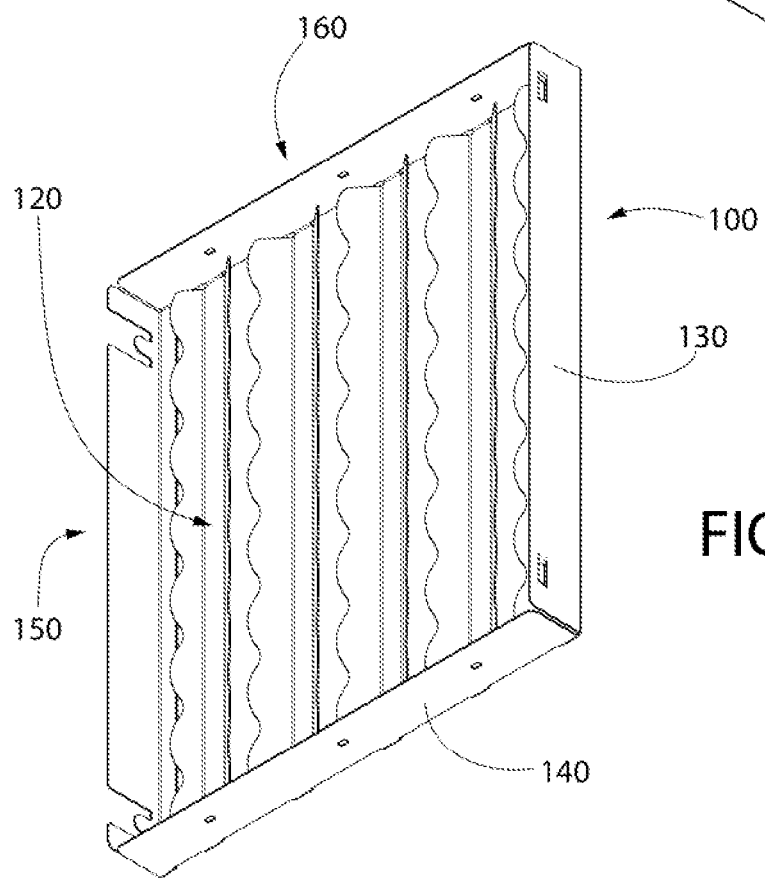
FIG. 2 is a perspective view of the filter shown in FIG. 1.

FIGS. 1 and 2 show an exemplary filter 100 in accordance with embodiments of the invention. FIG. 1 is a perspective view from a bottom side 110 of filter 100. FIG. 2 is a perspective view from a top side 120 of filter 100. Filter 100 has a first side 130, and a second side 150 opposite first side 130. Filter 100 has a first end 140, and a second end 160 opposite first end 140. A plurality of baffles 200, 300 extend from first end 140 to second end 160. In this embodiment, gases such as, for example, exhaust gases flow from bottom side 110, through filter 100, and out of top side 120. The gases pass through gaps between baffles 200, 300, a large portion of the gases contacting, and being redirected by, baffles 200, 300 before they pass through filter 100.

Also shown in FIG. 1 are bottom side surfaces 170, 180 that are, in this embodiment, flat surfaces near second side 150 and first side 130, respectively. As discussed below, bottom side surface 180 forms a portion of a half baffle 300.

Figure 3:
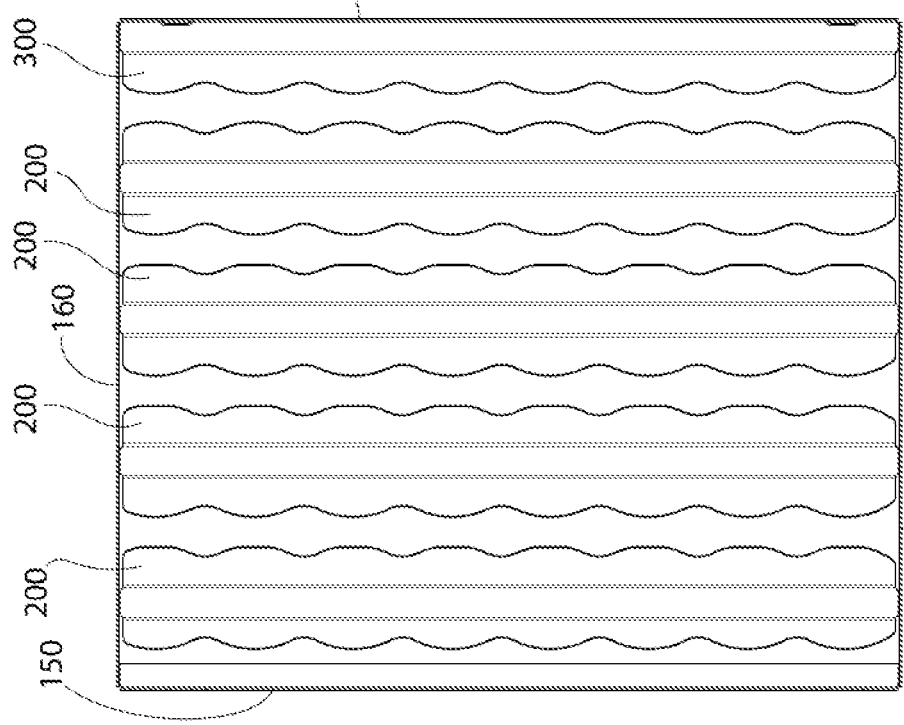
FIG. 3 is a top view of the filter shown in FIG. 1.

FIG. 3 is a top view of filter 100 and shows, in this embodiment, four full baffles 200 and one half baffle 300. As noted above, in this embodiment, the gases being filtered flow from bottom side 110 to top side 120. The convex side of baffles 200, 300 is shown in FIG. 3. While this embodiment has four full baffles 200 and one half baffle 300, it is noted that other embodiments have a different number of full baffles 200 and/or half baffles 300. The number of baffles, size of the baffles, and size of gaps between the baffles depends on the amount of airflow and redirection desired in a particular application.

Figure 4:
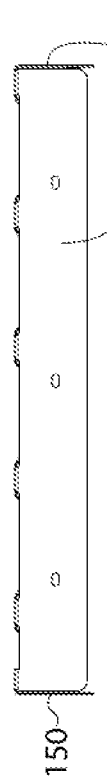
FIG. 4 is a right end view of the filter shown in FIG. 1.
Figure 5:
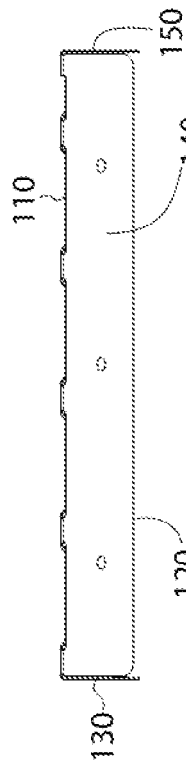
FIG. 5 is left end view of the filter shown in FIG. 1.
Figure 6:
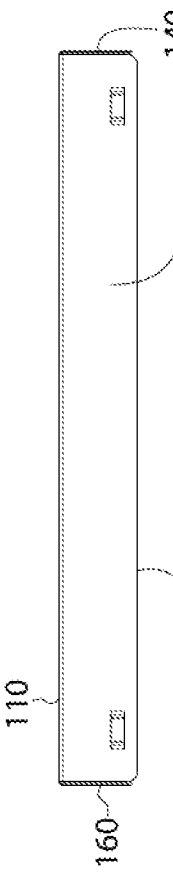
FIG. 6 is rear view of the filter shown in FIG. 1.
Figure 7:
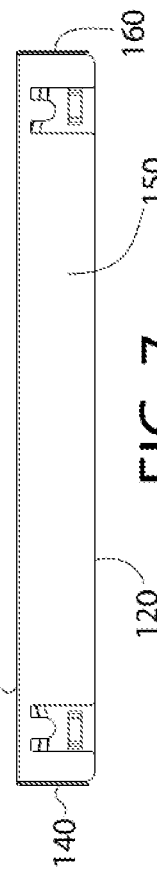
FIG. 7 is a front view of the filter shown in FIG. 1.

FIG. 4 is a view of second end 160, FIG. 5 is a view of first end 140, FIG. 6 is a view of first side 130, and FIG. 7 is a view of second side 150.

Figure 8:
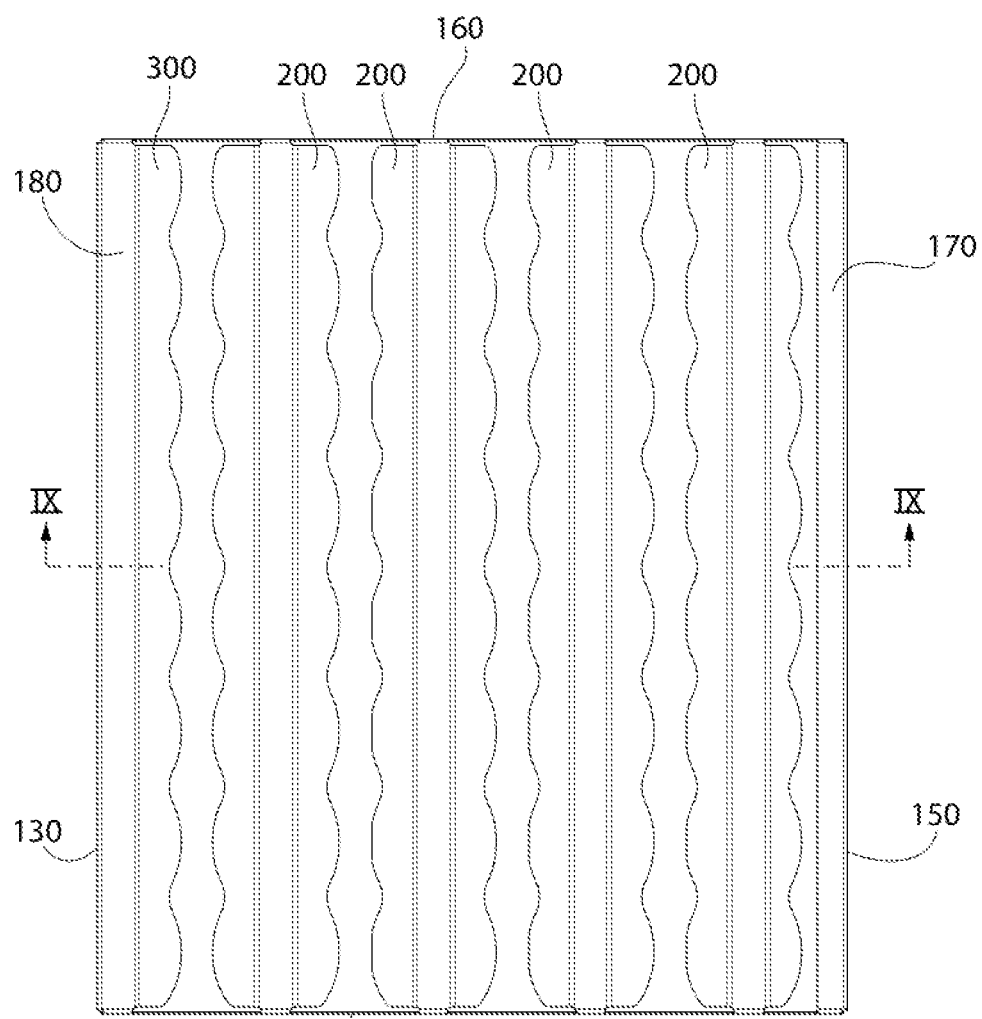
FIG. 8 is a bottom view of the filter shown in FIG. 1.
Figure 9:
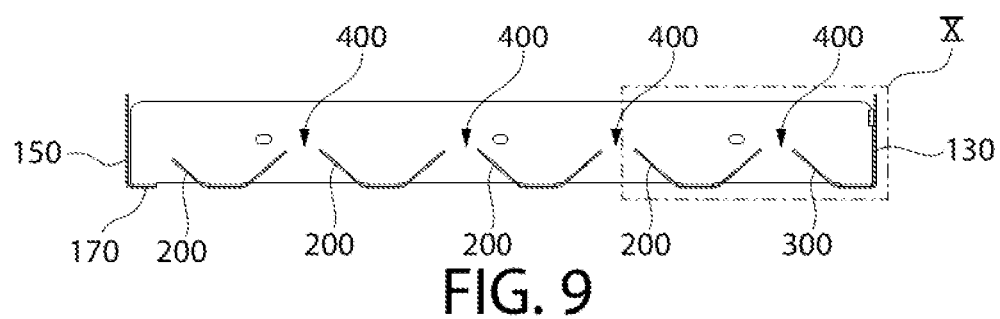
FIG. 9 is a sectional view taken along section line IX-IX in FIG. 8.

FIG. 8 is a bottom view of filter 100. The concave side of baffles 200, 300 is shown in FIG. 8. FIG. 9 is a sectional view taken along section line IX-IX in FIG. 8. FIG. 9 shows each baffle 200 having a concave side facing up and a convex side facing down. Half baffle 300 also has a concave side facing up and a convex side facing down. A gap 400 is formed between adjacent ones of baffles 200, 300. In use, exhaust gases flow in from the convex side (bottom) through gaps 400, and out passed the concave side (top). As the exhaust gases pass over baffles 200, 300, grease in the gases collects on both the lower (convex) sides and the upper (concave) sides of baffles 200, 300.

FIG. 10 is an enlarged view of area X shown in FIG. 9. This view shows baffle 200 having a central portion 210, and extensions 220, 230 extending upward and away from central portion 210. Half baffle 300 extends from bottom side surface 180 similarly to extensions 220, 230. Other embodiments have a half baffle 300 on both sides of filter 100, while still other embodiments have no half baffles and, instead, have a bottom side surface 170 on both sides of filter 100.

FIG. 11 shows one baffle 200 separated from filter 100. In this embodiment, extension 220 has a main portion 224 and an edge formed by a plurality of bumps 222. Bumps 222 form an undulating, or scalloped, edge to extension 220. While eight bumps 222 are shown in this example, other examples have fewer or more bumps 222. The depth of the undulations can be uniform as shown in FIG. 11 or varying. In this embodiment, extension 230 is a mirror image of extension 220 such that a plurality of bumps 232 form an undulating edge to a main portion 234. The length and depth of bumps 222 can be different than those shown in FIG. 11. For example, bumps 222 can be deeper or shallower in a direction toward central portion 210. Also, bumps 222 can be longer or shorter in a direction parallel to the longitudinal direction of baffle 200. An optimal size of these dimensions, and an optimal number of bumps 222 varies depending on the velocity and volume of the gases drawn through filter 100.

In the Figures, baffle 200 is shown having a flat central portion 210. In other embodiments, central portion 210 is angled such that it presents a surface that is not perpendicular to the general direction of the airflow through filter 100.

Figure 12:
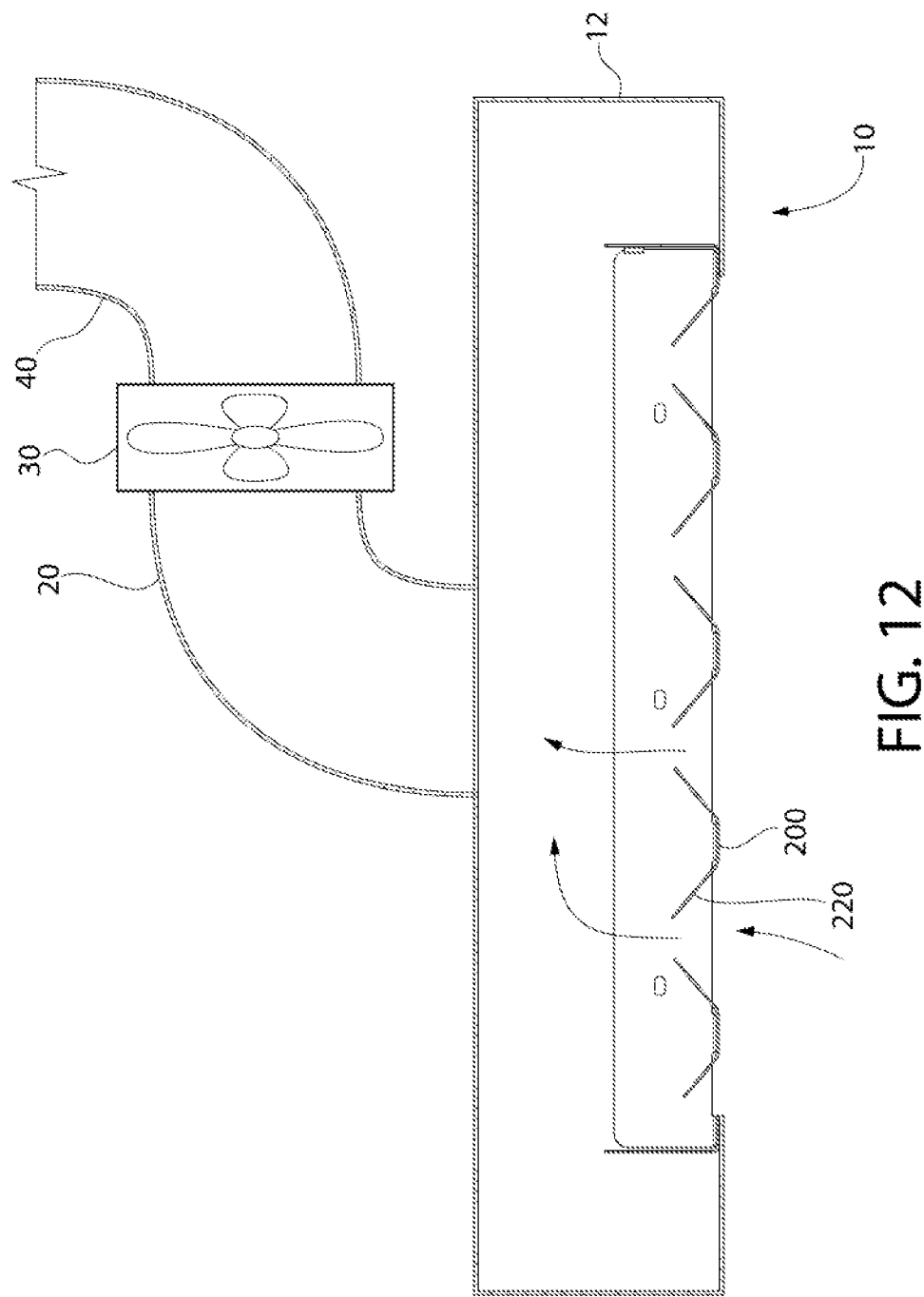
FIG. 12 is a schematic view of an exemplary exhaust hood in accordance with embodiments of the invention.

FIG. 12 shows an example of an exhaust hood 10 in accordance with embodiments of the invention. In this example, exhaust hood 10 has a housing 12 that receives filter 100. Exhaust hood 12 has, or is connected to, a fan 30 that draws exhaust gasses through filter 100 as shown by the arrows in FIG. 12. In some embodiments, fan 30 is connected to housing 12 by one or more air ducts 20. Gasses removed from housing 12 by fan 30 are exhausted through one or more ducts 40 to an area outside of housing 12. While this example shows one filter 100, other examples have two or more filters 100 or the same or different configuration. As shown by the arrows in FIG. 12, exhaust gases are drawn through gaps 400 with some of the gases coming in contact with extensions 220, 230 of baffles 200. As discussed above, at least a portion of the grease present in the exhaust gasses is collected on one or both sides of baffles 200 as the exhaust gasses come in contact with baffles 200.

It will be appreciated that variants of the above-disclosed and other features and functions, or alternatives thereof, may be combined into many other different systems or applications. Any of the features described above can be combined with any other feature described above as long as the combined features are not mutually exclusive. Various presently unforeseen or unanticipated alternatives, modifications, variations or improvements therein may be subsequently made by those skilled in the art which are also intended to be encompassed by the invention.

What is claimed is:

1. A filter for an exhaust hood, the filter comprising: a frame extending in a first direction and a second direction, the second direction being perpendicular to the first direction; a plurality of first baffles located in the frame, each first baffle extending in the first direction and having two edges that extend in the first direction, a first edge of the two edges of the first baffle having a first undulating shape, a second edge of the two edges of the first baffle having a second undulating shape; and a plurality of second baffles located in the frame, each second baffle extending in the first direction and having two edges that extend in the first direction, a first edge of the two edges of the second baffle having a third undulating shape, a second edge of the two edges of the second baffle having a fourth undulating shape, wherein the first baffle and the second baffle are separated in the second direction by a gap; wherein the first baffle has a central portion, a first extension extending from the central portion, and a second extension extending from the central portion, the first extension forms a first included angle with the central portion, the first included angle being greater than 90 degrees, and the second extension forms a second included angle with the central portion, the second included angle being greater than 90 degrees.

2. The filter of claim 1, wherein the gap extends in a third direction an entire depth of the filter in the third direction, and
the third direction is perpendicular to the first direction and perpendicular to the second direction.

3. The filter of claim 1, wherein the first undulating shape and the second undulating shape are scalloped shapes.

4. The filter of claim 1, wherein the first undulating shape forms a repeating curve for an entire length of the first edge, and
the second undulating shape forms a repeating curve for an entire length of the second edge.

5. The filter of claim 1, wherein the first edge of the first baffle and the second edge of the first baffle are mirror images of each other.

6. The filter of claim 5, wherein the first undulating shape and the third undulating shape are a same shape.

7. The filter of claim 1, wherein the first included angle and the second included angle are equal.

8. The filter of claim 7, wherein the first included angle is between 120 degrees and 150 degrees.

9. The filter of claim 8, further comprising a third baffle and a fourth baffle,
wherein the first baffle, the second baffle, the third baffle, and the fourth baffle are identical, and each of the baffles is separated from an adjacent one of the baffles by a respective gap that is equal to the gap between the first and second baffles.

10. The filter of claim 1, wherein the first undulating shape includes at least five undulations.

11. An exhaust hood, comprising: a housing having a filter receptacle; and a removable filter located in the filter receptacle, the filter having: a frame extending in a first direction and a second direction, the second direction being perpendicular to the first direction, a plurality of first baffles located in the frame, each first baffle extending in the first direction and having two edges that extend in the first direction, a first edge of the two edges of the first baffle having a first undulating shape, a second edge of the two edges of the first baffle having a second undulating shape, and a plurality of second baffles located in the frame, each second baffle extending in the first direction and having two edges that extend in the first direction, a first edge of the two edges of the second baffle having a third undulating shape, a second edge of the two edges of the second baffle having a fourth undulating shape, wherein the first baffle and the second baffle are separated in the second direction by a gap; wherein the first baffle has a central portion, a first extension extending from the central portion, and a second extension extending from the central portion, the first extension forms a first included angle with the central portion, the first included angle being greater than 90 degrees, and the second extension forms a second included angle with the central portion, the second included angle being greater than 90 degrees.

12. The exhaust hood of claim 11, further comprising an air mover that draws air through the filter.

13. The exhaust hood of claim 11, wherein the gap extends in a third direction an entire depth of the filter in the third direction, and
the third direction is perpendicular to the first direction and perpendicular to the second direction.

14. The exhaust hood of claim 11, wherein the first undulating shape forms a repeating curve for an entire length of the first edge, and
the second undulating shape forms a repeating curve for an entire length of the second edge.

15. The exhaust hood of claim 11, wherein the first edge of the first baffle and the second edge of the first baffle are mirror images of each other.

16. The exhaust hood of claim 11, wherein the first undulating shape and the third undulating shape are a same shape.

17. The exhaust hood of claim 11, wherein the first included angle and the second included angle are equal, and
the first included angle is between 120 degrees and 150 degrees.

18. The exhaust hood of claim 17, further comprising a third baffle and a fourth baffle,
wherein the first baffle, the second baffle, the third baffle, and the fourth baffle are identical, and
each of the baffles is separated from an adjacent one of the baffles by a respective gap that is equal to the gap between the first and second baffles.

* * * * *